US006981248B2

(12) United States Patent
Bates et al.

(10) Patent No.: US 6,981,248 B2
(45) Date of Patent: Dec. 27, 2005

(54) CONDITIONAL BREAKPOINT ENCOUNTERED INDICATION

(75) Inventors: Cary Lee Bates, Rochester, MN (US); Steven Gene Halverson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 10/137,827

(22) Filed: May 2, 2002

(65) Prior Publication Data
US 2003/0208746 A1 Nov. 6, 2003

(51) Int. Cl.⁷ ............................................. G06F 9/44
(52) U.S. Cl. ...................... 717/129; 717/124; 717/125; 717/127; 717/128; 714/34; 714/35
(58) Field of Search ............................... 717/124–130; 710/261; 714/38, 34, 35; 703/26; 709/206

(56) References Cited

U.S. PATENT DOCUMENTS

| 5,732,210 A | * | 3/1998 | Buzbee .................. 714/38 |
| 5,931,956 A | * | 8/1999 | Neff ...................... 714/34 |
| 6,282,701 B1 | * | 8/2001 | Wygodny et al. .......... 717/125 |
| 6,480,818 B1 | * | 11/2002 | Alverson et al. ............ 703/26 |
| 6,658,649 B1 | * | 12/2003 | Bates et al. ............... 717/124 |
| 6,681,280 B1 | * | 1/2004 | Miyake et al. ............. 710/261 |
| 6,836,857 B2 | * | 12/2004 | Ten-Hove et al. .......... 714/34 |
| 6,848,097 B1 | * | 1/2005 | Alverson et al. ........... 717/124 |
| 2003/0033592 A1 | * | 2/2003 | Tsubata et al. ............ 717/128 |
| 2003/0079159 A1 | * | 4/2003 | Ten-Hove et al. .......... 714/34 |
| 2003/0106045 A1 | * | 6/2003 | Arnold et al. ............. 717/129 |
| 2003/0225838 A1 | * | 12/2003 | Bates et al. .............. 709/206 |
| 2004/0040013 A1 | * | 2/2004 | Kalra ..................... 717/129 |
| 2004/0088462 A1 | * | 5/2004 | Miyake et al. ............. 710/261 |
| 2004/0205720 A1 | * | 10/2004 | Hundt ..................... 717/124 |

OTHER PUBLICATIONS

Manabe et al., Debugging dynamic distributed programs using global predicates, Proceedings of the Fourth IEEE Symposium on , Dec. 1-4, 1992, pp.:402-407.*
Tucker et al., Compiler optimization and its impact on development of real-time systems, Digital Avionics Systems Conference, 1998. Proceedings., 17th DASC. The AIAA/IEEE/SAE , vol.: 1 , Oct. 31-Nov. 7, 1998, pp.:C12/1-C12/6 vol. 1.*
Carreon, Debugging, InfoWorld. San Mateo: May 13, 1996. vol. 18, Iss. 20; p. 94 (2 pages).*
IBM techinical disclosure Bulletin, Packaging Scheme for Bound Service Program in Operating System, IBM techinical disclosure Bulletin, Sep. 1993, vol. 36, pp. 451-452.*
Manabe et al., Debugging dynamic distributed programs using global predicates, IEEE, Dec. 1-4, 1992 Page(s):402-407.*
Blum, Asymptotically optimum quantization with time invariant breakpoints for signal detection, IEEE, vol. 37, Issue 2, Mar. 1991 Page(s):402-407.*
Tucker et al., Compiler optimization and its impact on development of real-time systems, IEEE, vol. 1, Oct. 31-Nov. 7, 1998 Page(s):C12/1-C12/6.*

* cited by examiner

Primary Examiner—Tuan Dam
Assistant Examiner—Satish S. Rampuria
(74) Attorney, Agent, or Firm—Patterson & Sheridan, LLP (57) ABSTRACT

A method and apparatus for determining whether a conditional breakpoint was encountered during a debug execution. In one embodiment, the method comprises determining whether a breakpoint was encountered; if the breakpoint was encountered, determining whether the breakpoint is a conditional breakpoint; and if the breakpoint is the conditional breakpoint, incrementing a first count configured to indicate a number of times the conditional breakpoint was encountered during the debug execution.

32 Claims, 6 Drawing Sheets

Breakpoint Table 400

| Address 402 | Opcode 404 | Encountered Count 406 | History Records | Conditional Expression 416 |
|---|---|---|---|---|
| 7865A68F | TJP | 0 | | in==1 |
| 987698F6 | LOD | 4 | o⟶ | index==3 |
| 87658779 | CALL | | | |

| | 409 Total Enc Fire | 410 Thread1 Enc | 411 Thread1 Fire | 412 Thread2 Enc | 413 Thread2 Fire | 414 Thread3 Enc | 415 Thread3 Fire |
|---|---|---|---|---|---|---|---|
| 408 | 9  2 | 4 | 1 | 5 | 1 | | |

CONDITIONAL BREAKPOINT ENCOUNTERED INDICATION

BACKGROUND OF THE INVENTION

1. Field of the Invention

The present invention generally relates to data processing and more particularly to debugging code.

2. Description of the Related Art

A programmer develops a software program by producing and entering source code into files using a text editor program. The computer then creates an executable program by translating the source code into machine code. The machine code is the rudimentary instructions understood by a computer. Illustratively, the foregoing software development process is accomplished by running a series of programs. These programs typically include a compiler for translating the source code into machine code and a linker to link the machine code together to form a program.

When developing computer software, it is necessary to perform a function termed "debugging". Debugging involves testing and evaluating the software to find and correct any errors and improper logic operation. An effective debugger program is necessary for rapid and efficient development of software and typically provides functions including breakpoints, run-to-cursor, step into, step over and the like.

One type of a breakpoint is a conditional breakpoint, which is configured to stop execution of the debugging program (i.e., the breakpoint fires) when the conditional breakpoint is encountered and when its related condition is true. A conditional breakpoint therefore does not fire if the related condition remains false. If a conditional breakpoint does not fire, a user is left to guess as to whether the debugging program missed the conditional breakpoint (i.e., whether the conditional breakpoint is ever encountered by the program) or whether the condition is still false. Often times, because the user believes that the condition had to be true, the user mistakenly assumes that the program must have missed the conditional breakpoint, i.e., the conditional breakpoint was never encountered.

A need therefore exists for a method and article of manufacture and system for determining whether a conditional breakpoint was encountered during a debug run/execution.

SUMMARY OF THE INVENTION

The present invention generally is a method of determining whether a conditional breakpoint was encountered during a debug execution. The method comprises determining whether a breakpoint was encountered; if the breakpoint was encountered, determining whether the breakpoint is a conditional breakpoint; and if the breakpoint is the conditional breakpoint, incrementing a first count configured to indicate a number of times the conditional breakpoint was encountered during the debug execution.

In another embodiment, the present invention is directed to a method of debugging code using a debugging program. The method comprises during execution of the code, determining that at least one conditional breakpoint was encountered but not fired; halting execution of the code upon occurrence of a debug stop event; and displaying an encountered indicator indicating that the at least one conditional breakpoint was encountered but not fired.

In yet another embodiment, the present invention is directed to a computer readable medium containing a program which, when executed, performs an operation, comprising: determining whether a breakpoint was encountered; if the breakpoint was encountered, determining whether the breakpoint is a conditional breakpoint; and if the breakpoint is the conditional breakpoint, incrementing a first count configured to indicate a number of times the conditional breakpoint was encountered during the debug execution.

In still yet another embodiment, the present invention is directed to computer readable medium containing a program which, when executed, performs an operation, comprising: during execution of the code, determining that at least one conditional breakpoint was encountered but not fired; halting execution of the code upon occurrence of a debug stop event; and displaying an encountered indicator indicating that the at least one conditional breakpoint was encountered but not fired.

In still yet another embodiment, the present invention is directed to a computer, comprising: a memory containing a debugging program; and a processor which, when executing the program, performs an operation. The operation comprises: determining whether a breakpoint was encountered; if the breakpoint was encountered, determining whether the breakpoint is a conditional breakpoint; and if the breakpoint is the conditional breakpoint, incrementing a first count configured to indicate a number of times the conditional breakpoint was encountered during the debug execution.

In a further embodiment, the present invention is directed to a computer, comprising: a memory containing a debugging program; and a processor which, when executing the program, performs an operation. The operation comprises: during execution of the code, determining that at least one conditional breakpoint was encountered but not fired; halting execution of the code upon occurrence of a debug stop event; and displaying an encountered indicator indicating that the at least one conditional breakpoint was encountered but not fired.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention provide a user with information that indicates to the user which conditional breakpoints were fired and which were encountered but did not fire during a debug run/execution. In one aspect, if a conditional breakpoint is encountered, then an indicator indicating that the conditional breakpoint was encountered is displayed. In one embodiment, the indicator is displayed proximate a position at which the conditional breakpoint is set. In another embodiment, the indicator is displayed in a breakpoint panel in a user interface screen. In yet another embodiment, the debugger program keeps track of the number of times a conditional breakpoint is encountered and fired. Thus, in addition to the indicator, a count indicating the number of times the conditional breakpoint is encountered is displayed. In still another embodiment, a count indicating the number of times the conditional breakpoint fired is displayed. In still yet another embodiment, a count indicating the number of times the conditional breakpoint is encountered and fired for each thread of execution is displayed.

One embodiment of the invention is implemented as a program product for use with a computer system such as, for example, the computer 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
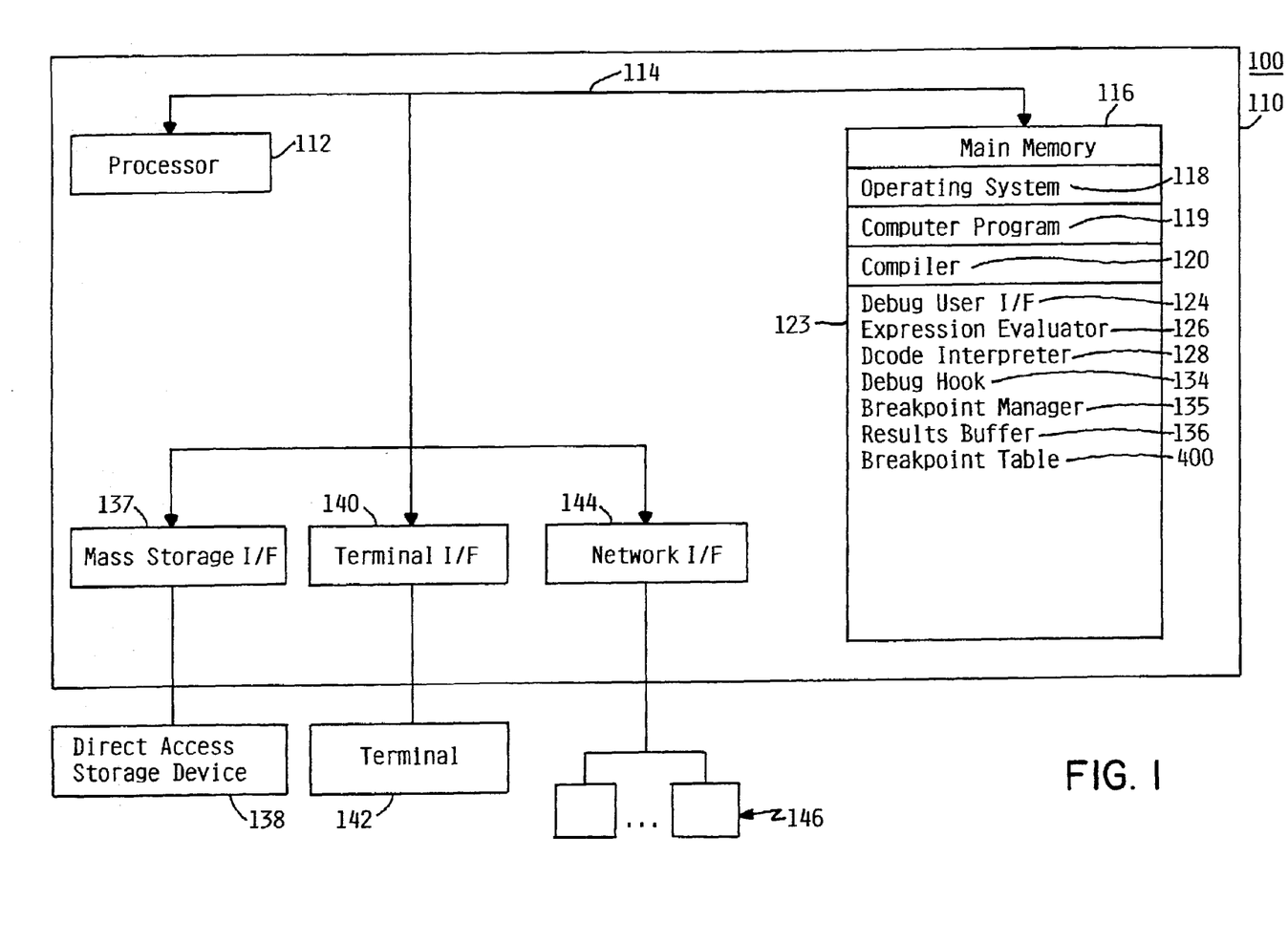
FIG. 1 is a high-level diagram of one embodiment of a computer.

Referring now to FIG. 1, a computing environment 100 is shown. In general, the distributed environment 100 includes a computer system 110 and a plurality of networked devices 146. For simplicity, only the details of the computer system 110 are shown. However, it is understood that the computer system 110 may be representative of one or more of the networked devices 146. In general, computer system 110 and the networked devices 146 could be any type of computer, computer system or other programmable electronic device, including desktop or PC-based computers, workstations, network terminals, a client computer, a server computer, a portable computer, an embedded controller, etc.

Although shown networked into a larger system, the computer system 110 may be a standalone device. Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiment may also be practiced in distributed computing environments in which tasks are performed by remote processing devices that are linked through a communications network. In a distributed computing environment, program modules may be located in both local and remote memory storage devices. In this regard, the computer system 110 and one or more of the networked devices 146 may be thin clients which perform little or no processing. In a particular embodiment, the computer system 110 is an eServer iSeries 400 computer available from International Business Machines, Corporation of Armonk, N.Y.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions, or operation codes, (also known as opcodes), and data via a bus 114 from a main memory 116. The processor 112 could be any processor adapted to support the debugging methods, apparatus and article of manufacture of the invention. In particular, the computer processor 112 is selected to support the debugging features of the present invention. Illustratively, the processor is a PowerPC available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 114.

As shown, the main memory 116 generally includes an operating system 118, a computer program 119, a compiler 120 and debugger program (the debugger) 123. The operating system may be any suitable operating system such as OS/400. The computer program 119 represents any code that is to be examined, edited, compiled and/or debugged. In one embodiment, the debugger 123 is a graphical user interface system debugger for the eServer iSeries computer. OS/400 and eServer iSeries are available from International Business Machines, Corporation of Armonk, N.Y.

Although the software constructs, such as the computer program 119 and the debugger 123, are shown residing on the same computer, a distributed environment is also contemplated. Thus, for example, the debugger 123 may be located on a networked device 146, while the computer program 119 to be debugged is on the computer system 110.

In a specific embodiment, the debugger 123 comprises a debugger user interface 124, expression evaluator 126, Dcode interpreter 128 (also referred to herein as the debug interpreter 128), debugger hook (also known as a stop handler) 134, a breakpoint manager 130, a results buffer 136 and a breakpoint table 150. Although treated herein as integral parts of the debugger 123, one or more of the foregoing components may exist separately in the computer system 110. Further, the debugger may include additional components not shown.

Figure 2:
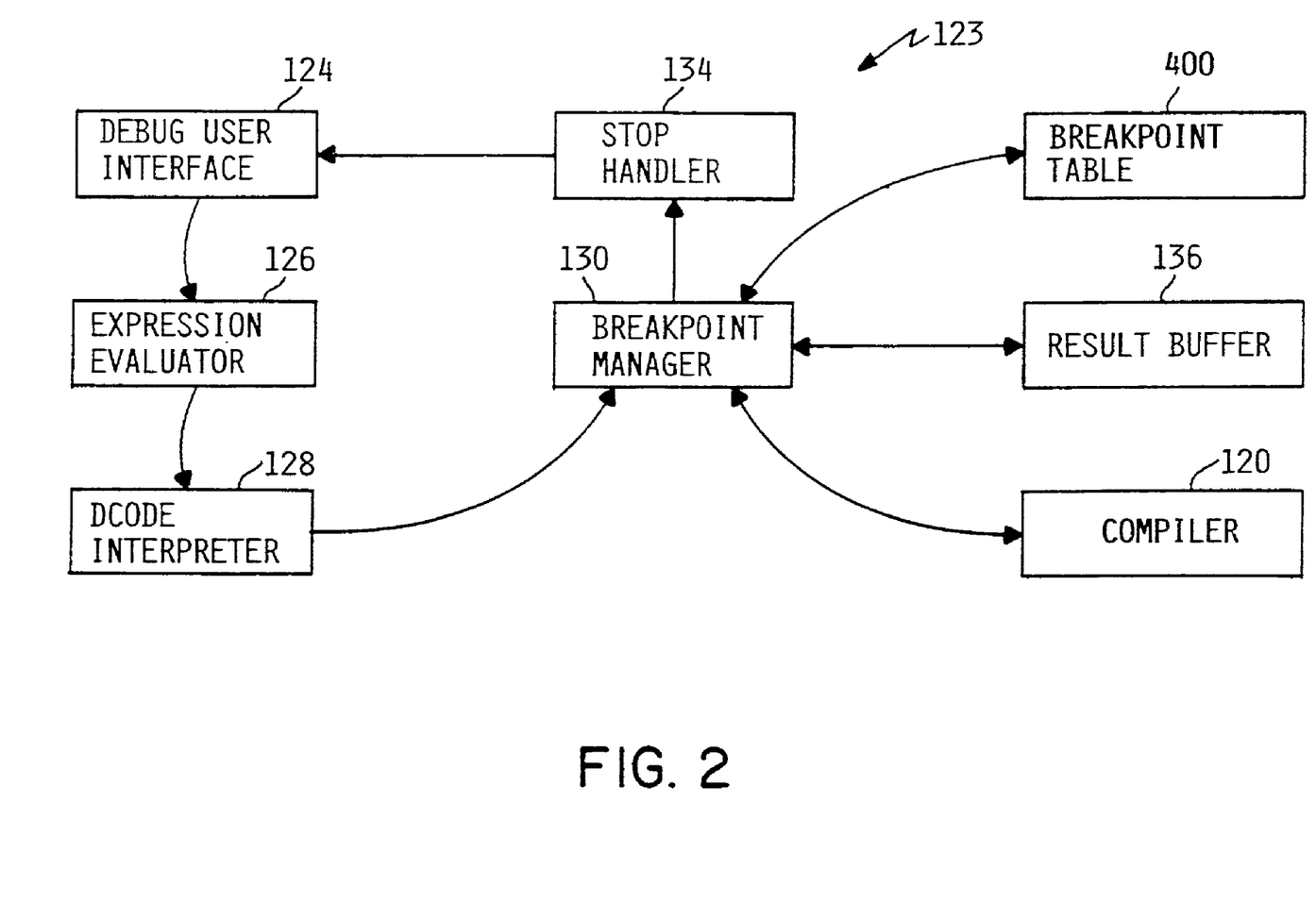
FIG. 2 is a block diagram illustrating the operation of a debugger.

An illustrative debugging process is now described with reference to FIG. 2. A debugging process is initiated by the debug user interface 124. The user interface 124 presents the program under debugging and highlights the current line of the program on which a stop or error occurs. The user interface 124 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross-referenced.

The expression evaluator 126 parses the debugger command passed from the user interface 124 and uses a data structure (e.g., a table) generated by the compiler 120 to map the line number in the debugger command to the physical memory address in memory 116. In addition, the expression evaluator 126 generates a Dcode program for the command. The Dcode program is machine executable language that emulates the commands. Some embodiments of the invention include Dcodes which, when executed, activate control features described in more detail below.

The Dcode generated by the expression evaluator 126 is executed by the Dcode interpreter 128. The interpreter 128 handles expressions and Dcode instructions to perform various debugging steps. Results from Dcode interpreter 128 are returned to the user interface 124 through the expression evaluator 126. In addition, the Dcode interpreter 128 passes on information to the stop handler 134, which takes steps described below.

After the commands are entered, the user provides an input that resumes execution of the program 120. During execution, control is returned to the debugger 123 via the stop handler 134. The stop handler 134 is a code segment that returns control to the appropriate user interface. In some implementations, execution of the program eventually results in an event causing a trap to fire (e.g., a breakpoint or watchpoint is encountered). Inserting and managing special op codes that cause these traps to fire is the responsibility of the breakpoint manager 130. When a trap fires, control is then returned to the debugger by the stop handler 134 and program execution is halted. The stop handler 134 then invokes the debug user interface 124 and may pass the results to the user interface 124. Alternatively, the results may be passed to the results buffer 136 to cache data for the user interface 124. In other embodiments, the user may input a command while the program is stopped, causing the debugger to run a desired debugging routine. Result values are then provided to the user via the user interface 124.

If the breakpoint encountered is a conditional breakpoint, a determination is made as to whether a condition related to the conditional breakpoint is true or false. If the condition is true, then the conditional breakpoint fires. On the other hand, if the condition is false, then the conditional breakpoint does not fire. In one embodiment, this determination step is performed by the stop handler 134. In another embodiment, the stop handler 134 is also configured to keep a record of the number of times a breakpoint was encountered and fired.

Figure 3:
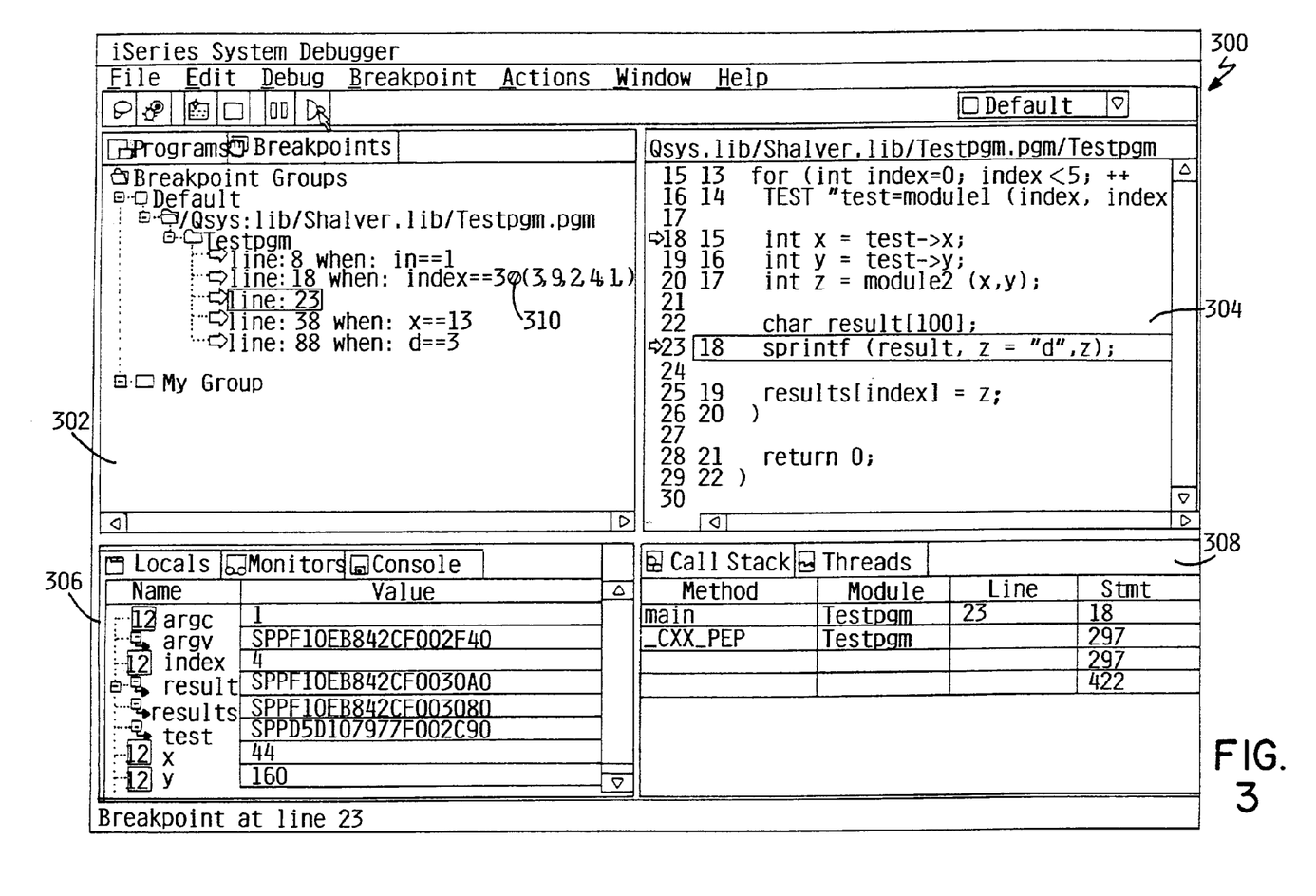
FIG. 3 is a user interface screen of the user interface in accordance with an embodiment of the present invention.

Referring now to FIG. 3, user interface screen 300 of the user interface 124 in accordance with an embodiment of the present invention is illustrated. The user interface screen 300 includes a breakpoint panel 302, a source code panel 304, a local variable panel 306 and a call stack panel 308. The breakpoint panel 302 contains two breakpoint groups—Default and My Group. The Default breakpoint group contains a list of code lines describing the breakpoints, i.e., line 8, line 18, line 23, line 38 and line 88. Line 8 is a conditional breakpoint with a related condition of in==1. Line 18 is a conditional breakpoint with a related condition of index==3. Line 23 is a non-conditional breakpoint. Line 38 is a conditional breakpoint with a related condition x==13. Line 88 is a conditional breakpoint with a related condition d==3. My Group is a breakpoint group that has been created by the user for future use, which will be discussed in detail in the following paragraphs.

In accordance with an embodiment of the present invention, line 18 is highlighted with an encountered indicator 310, e.g., a green dot (represented by cross hatch) proximate the related condition. This encountered indicator is configured to indicate that the conditional breakpoint set on line 18 was encountered. In one embodiment, a set of numbers separated by commas is displayed next to the encountered indicator 310. This set of numbers indicates historical data for the breakpoint set on line 18, which will be discussed in detail in the following paragraphs. In accordance with another embodiment of the present invention, the encountered indicator 310 is not limited to the green dot; in fact, any type of symbol may be used as the encountered indicator 310. Line 23 is highlighted in its entirety, indicating that the breakpoint on line 23 was encountered and fired, which halts or stops the program execution and causes the user interface screen 300 to be displayed as described herein. The source code on line 23 in the source code panel 304 is also highlighted.

The source code panel 304 displays the source codes written on each code line. The arrows pointing to line 18 and line 23 indicate the location of the breakpoints. The source code on line 23 is highlighted, as line 23 in the breakpoint panel 302 is also highlighted. The local variable panel 306 contains information about local variables for the current procedure or routine that was just halted. The call stack panel 308 provides the user with a way to navigate to other procedures on the call stack.

Figure 4:
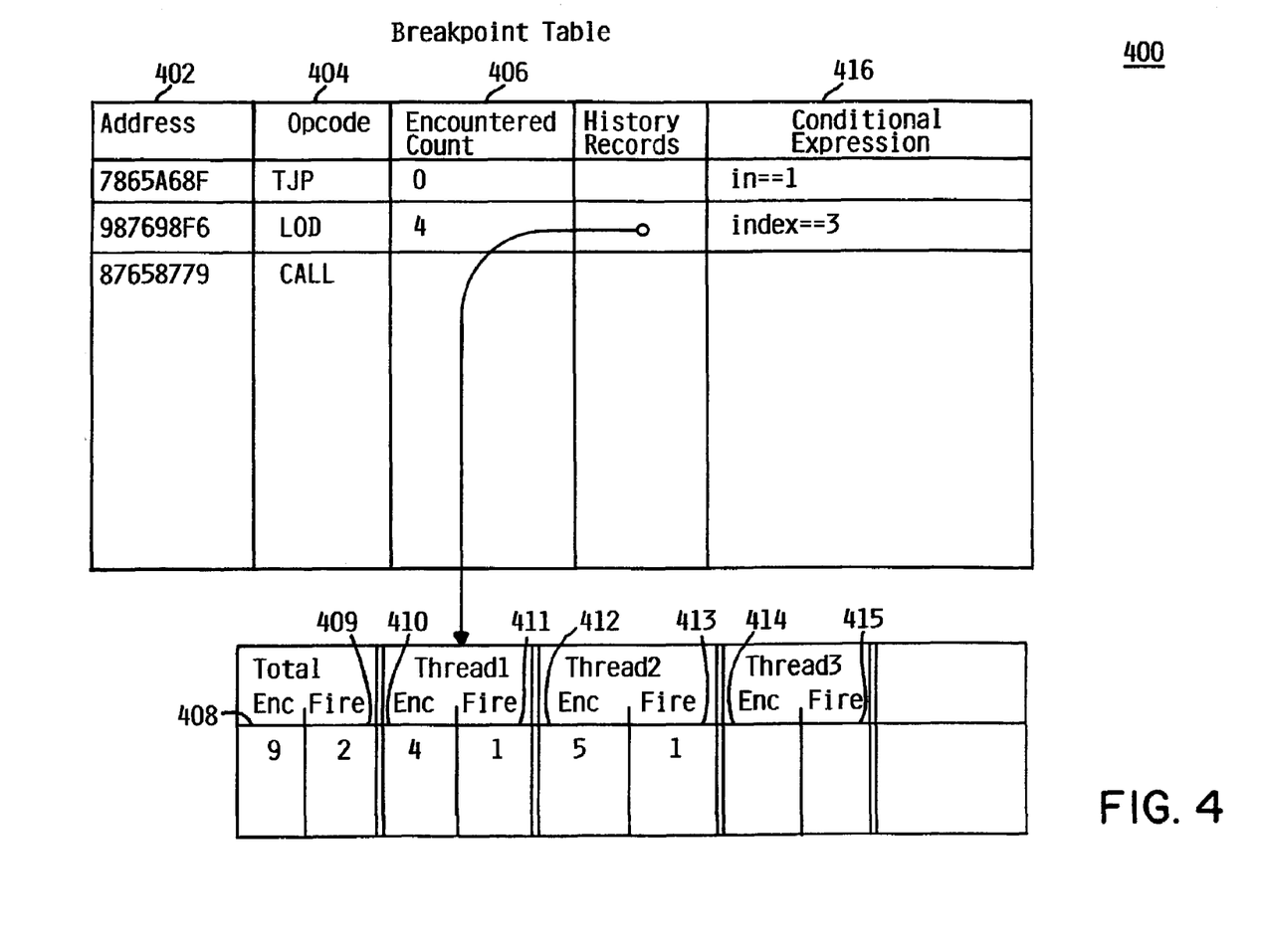
FIG. 4 is a breakpoint table in accordance with an embodiment of the present invention.

Referring now to FIG. 4, a breakpoint table 400 in accordance with an embodiment of the present invention is illustrated. In general, the breakpoint table 400 provides some aspects which are well-known in the art in combination with some inventive features. For example, as is well-known, an address column 402, an op code (operation code) column 404, and a conditional expression column 416 are shown. The information contained under the address column 402 specifies a memory address of a breakpoint. The information contained under the op code column 404 specifies the original operation code of the program which has been replaced with some "bad" operation code. The information contained under the conditional expression column 416 specifies a condition for a conditional breakpoint.

In accordance with an embodiment of the present invention, the breakpoint table 400 includes an encountered count column 406. The information contained under the encountered count column 406 specifies the number of times a breakpoint, more specifically, a conditional breakpoint, was encountered since the last debug stop event, i.e., during a debug run/execution. A debug stop event is defined as any event that allows the debugger 123 to take control. In one embodiment, the information contained under the encountered count column 406 is cleared or reset to zero at the beginning of each debug execution or when the debug execution is resumed.

In another embodiment, the breakpoint table 400 further includes columns for containing historical data, such as, a total encountered count column 408. The information contained under the total encountered count column 408 specifies the total number of times a breakpoint, more specifically a conditional breakpoint, is encountered since the beginning of the debugging session. In yet another embodiment, the breakpoint table 400 includes a total fired count column 409. The information contained under the total fired count column 409 specifies the total number of times a breakpoint, more specifically a conditional breakpoint, fired since the beginning of the debugging program. In still another embodiment, the breakpoint table 400 includes a total encountered count for thread column 410. The information contained under the total encountered count for thread column 410 specifies the total number of times a breakpoint, more specifically a conditional breakpoint, is encountered since the beginning of the debugging program for a particular thread of execution. If more than one thread of execution is involved, the breakpoint table 400 will include additional total encountered count for thread columns, each corresponding to the particular thread of execution, e.g., total encountered count for thread columns 412 and 414. In yet still another embodiment, the breakpoint table 400 includes a total fired count for thread column 411. The information contained under the total fired count for thread column 411 specifies the total number of times a breakpoint, more specifically a conditional breakpoint, fired since the beginning of the debugging program for a particular thread of execution. If more than one thread of execution is involved, the breakpoint table 400 will include additional total fired count for thread columns, each corresponding to the particular thread of execution, e.g., total fired count for thread columns 413 and 415. In one embodiment, the historical data, e.g., the information contained under the total encountered count column 408, the information contained under the total fired count column 409, information contained under the total encountered count for thread column 410, and information contained under the total fired count for thread column 411 may be displayed as a cursor is placed over an encountered indicator 310 of a breakpoint, as shown in the breakpoint panel 302. Other means known to one with ordinary skill in the art may be used to display the historical data.

Figure 5A:
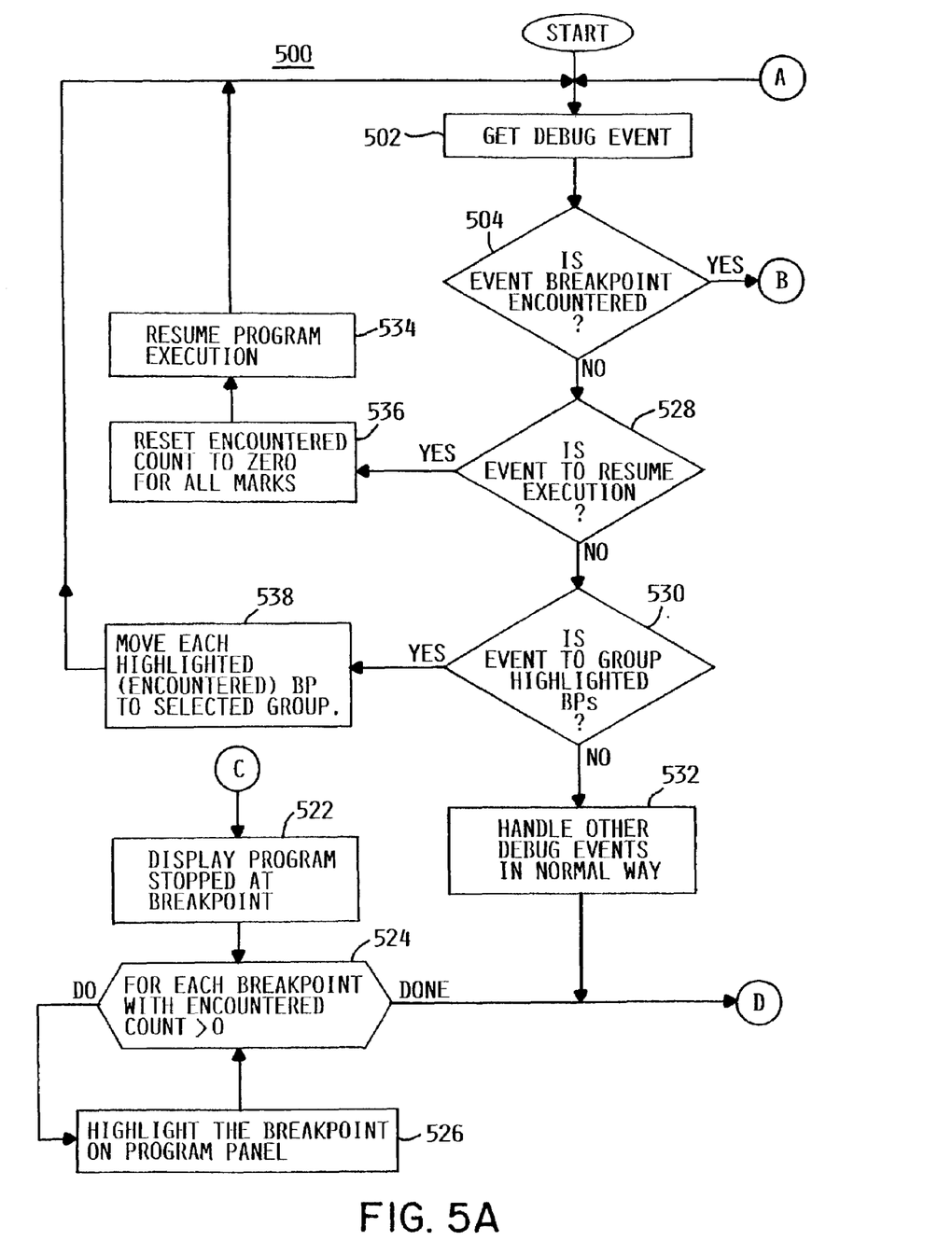
FIGS. 5A and 5B illustrate a method of operating the debugger in a manner consistent with embodiments of the present invention.
Figure 5B:
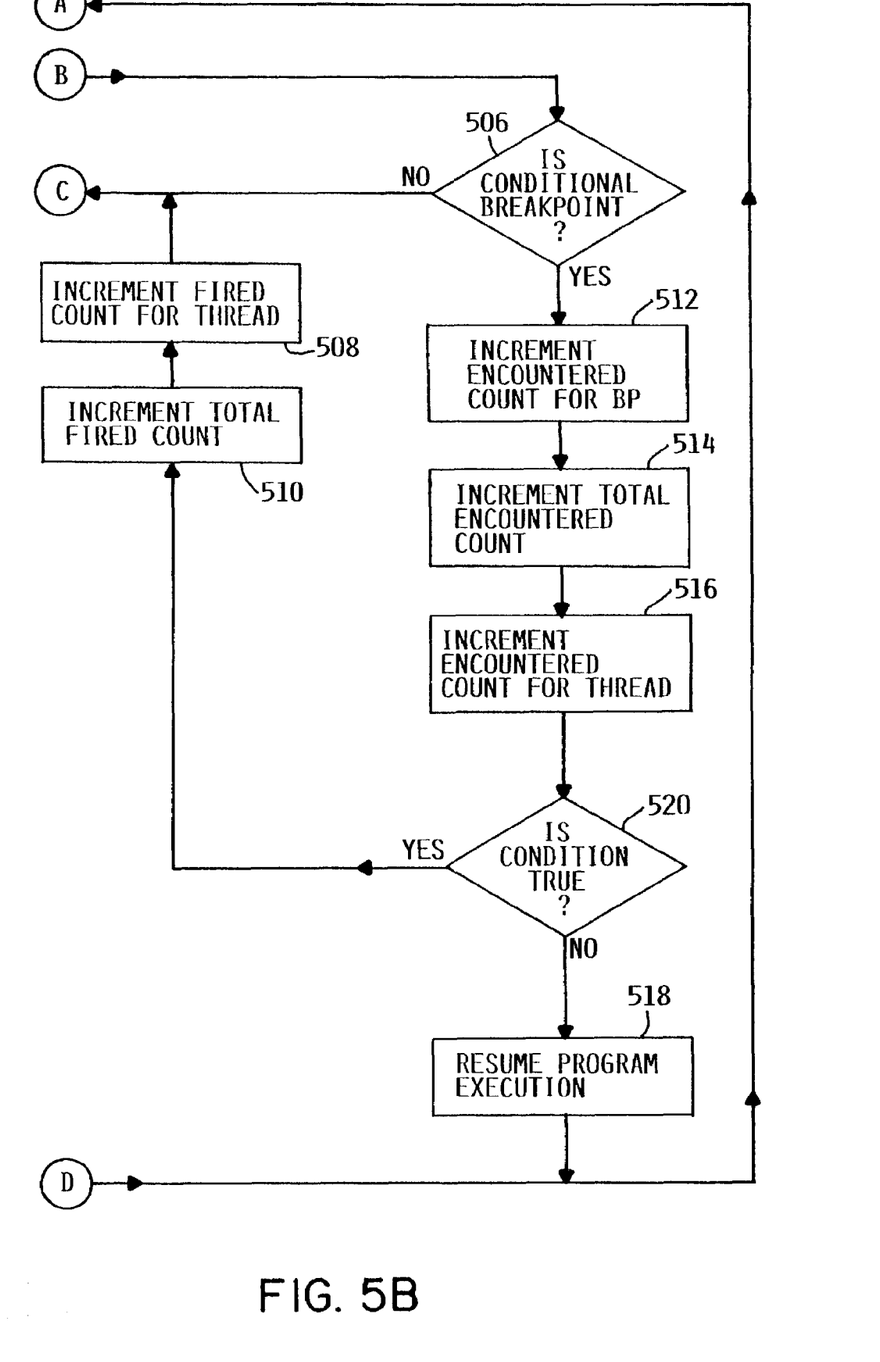

Referring now to FIGS. 5A and 5B, a method 500 of operating the debugger 123 in a manner consistent with embodiments of the present invention is shown. Upon receiving a debug event (step 502), the debugger 123 determines whether the debug event is a breakpoint (step 504). If not, a determination is made as to whether the debug event is to resume execution, such as, a go or run command (step 528). If so, the encountered count for all breakpoints is set to zero (step 536). At step 534, the program execution is resumed. Processing continues to step 502.

Referring back to step 504, if the debug event is a breakpoint, the debugger 123 determines whether the debug event is a conditional breakpoint (step 506). If so, the encountered count for the conditional breakpoint is incremented (step 512). An example of a conditional breakpoint is the breakpoint at line 18 with the condition of index==3 (shown in FIG. 3). In one embodiment, the encountered count is incremented only when the conditional breakpoint is encountered but not fired. Thus, the information contained under the encountered count column 406 would be indicative of the number of times the conditional breakpoint was encountered but not fired. At step 514, the total encountered count for the conditional breakpoint is also incremented. At step 516, the total encountered count for the thread in which the line of the breakpoint was encountered is incremented. At step 520, a determination is made as to whether the condition for the conditional breakpoint is true. If not, the program execution is resumed (step 518). For instance, using the same example above, i.e., the conditional breakpoint on line 18, if the index for the particular run is 1, then the condition index==3 is not met. Therefore, the condition is not true. Processing returns to step 502, which was previously discussed.

On the other hand, if the answer to step 520 is yes, then the total fired count for the conditional breakpoint is incremented (step 510). For example, if the index for the particular run is 3, then the condition for the conditional breakpoint on line 18 becomes true. At step 508, the total fired count for the thread of execution in which the line of the breakpoint fired is incremented. At step 522, the breakpoint panel 302 in the user interface screen 300 is displayed containing the positions at which the breakpoints are set (see FIG. 3). At steps 524–526, for each breakpoint with an encountered count greater than zero, the position at which the breakpoint is set is highlighted with an encountered indicator 310, e.g., with a green dot. For instance, the position on line 18 is highlighted with a green dot (represented by cross hatch) in the breakpoint panel 302 (see FIG. 3). In one embodiment, the encountered count for each breakpoint is displayed inside the encountered indicator. Processing then returns to step 502.

Referring back to step 506, if the debug event is not a conditional breakpoint, the breakpoint panel 302 in the user interface screen 300 is displayed containing the positions at which the breakpoints are set (see FIG. 3). For instance, line 23 contains a non-conditional breakpoint. Thus, when the breakpoint set on line 23 is encountered, the non-conditional breakpoint fired, the program execution is halted and the breakpoint panel 302 is displayed.

Referring back to step 528, if the debug event is not to resume execution, then a determination is made as to whether the debug event is a command to collect all breakpoints highlighted with the encountered indicator to a breakpoint group (step 530). If so, all the breakpoints highlighted with the encountered indicator are selected and moved to a breakpoint group of choice (step 538), e.g., My Group in FIG. 3. Processing then continues to step 502. One of the benefits of collecting all the breakpoints into one group is for the ease of managing these breakpoints, e.g., being able to execute an operation on these breakpoints all at once. For instance, all the breakpoints in the breakpoint group may be disabled all at once. The command to collect all breakpoints highlighted with the encountered indicator into a selected breakpoint group maybe accessed in any variety of ways, including right-clicking a mouse after one of the highlighted breakpoints is selected.

On the other hand, if the debug event is not a command to collect all breakpoints highlighted with the encountered indicator to a breakpoint group, then the debug event is handled in an appropriate manner according to the design of the debugger 123 (step 532). Examples for such a debug event include events for asking variable values, setting the breakpoints, and scrolling the screen up and down. Processing then returns to step 502 at which the debugger 123 waits for the next debug event.

While the foregoing is directed to embodiments of the present invention, other and further embodiments of the invention may be devised without departing from the basic scope thereof, and the scope thereof is determined by the claims that follow.

What is claimed is:

1. A method of determining whether a conditional breakpoint was encountered during a debug execution, the method comprising:
   determining whether a breakpoint was encountered;
   if the breakpoint was encountered, determining whether the breakpoint is a conditional breakpoint;
   if the breakpoint is the conditional breakpoint, incrementing at least one of a plurality of counters selected from: a first counter configured to indicate a number of times the conditional breakpoint was encountered during the debug execution, a second counter configured to indicate a total number of times the conditional breakpoint is encountered, and a third counter configured to indicate a total number of times the conditional breakpoint is encountered for each thread of execution; and
   when the debug execution halts, displaying a counter value for one of the first counter, the second counter and the third counter; wherein displaying comprises passing the counter value to a debug user interface.

2. The method of claim 1, further comprising, if the breakpoint is the conditional breakpoint:
   incrementing the first counter; and
   resetting the first counter to zero at the beginning of the debug execution.

3. The method of claim 1, wherein the user interface is a graphical user interface and wherein
   displaying comprises displaying a value of one of the first counter, the second counter and the third counter proximate a position at which the conditional breakpoint is set.

4. The method of claim 1, further comprising, if the breakpoint is the conditional breakpoint:
   determining whether a condition for the conditional breakpoint is true; and if the condition is true, incrementing at least one of a fourth counter configured to indicate a total number of times the conditional breakpoint fired and a fifth counter configured to indicate a total number of times the conditional breakpoint fired for each thread of execution.

5. The method of claim 1, further comprising, if the breakpoint is the conditional breakpoint:
   determining whether a condition for the conditional breakpoint is true; and
   if the condition is true, incrementing at least one of a fourth counter configured to indicate a total number of times the conditional breakpoint fired and a fifth counter configured to indicate a total number of times the conditional breakpoint fired for each thread of execution; and
   displaying, when the debug execution halts, one of the fourth counter and the fifth counter by passing a counter value of one of the fourth and fifth counter, respectively, to the user interface.

6. The method of claim 1, further comprising, if the breakpoint is the conditional breakpoint:
   determining whether a condition for the conditional breakpoint is true; and
   if the condition is true, incrementing at least one of a fourth counter configured to indicate a total number of times the conditional breakpoint fired and a fifth counter configured to indicate a total number of times the conditional breakpoint fired for each thread of execution; and
   displaying, when the debug execution halts, one of the fourth counter and the fifth counter proximate a position at which the conditional breakpoint was encountered.

7. The method of claim 1, wherein the debug execution is a debug execution between two debug stop events.

8. A method of debugging code using a debugging program, comprising:
   during execution of the code, determining that at least one conditional breakpoint was encountered but not fired;
   halting execution of the code upon occurrence of a debug stop event; and
   displaying an encountered indicator indicating that the at least one conditional breakpoint was encountered but not fired.

9. The method of claim 8, wherein the encountered indicator is displayed proximate a position at which the each one of the at least one conditional breakpoint is set.

10. The method of claim 8, wherein the encountered indicator is displayed in a breakpoint panel of a user interface screen.

11. The method of claim 8, further comprising, displaying one of a first counter indicating a number of times the at least one conditional breakpoint was encountered, a second counter indicating a total number of times the at least one conditional breakpoint was encountered, and a third counter indicating a total number of times the at least one conditional breakpoint was encountered for each thread of execution.

12. The method of claim 8, further comprising, displaying one of a first counter indicating a number of times the at least one conditional breakpoint was encountered, a second counter indicating a total number of times the at least one conditional breakpoint was encountered, and a third counter indicating a total number of times the at least one conditional breakpoint was encountered for each thread of execution; and wherein the first counter is reset to zero at the beginning of each debug execution.

13. The method of claim 8, further comprising, displaying one of a first counter indicating a number of times the at least one conditional breakpoint was encountered, a second counter indicating a total number of times the at least one conditional breakpoint was encountered, and a third counter indicating a total number of times the at least one conditional breakpoint was encountered for each thread of execution, the one of the first counter, the second counter and the third counter being displayed proximate a position at which the at least one conditional breakpoint is set.

14. The method of claim 8, further comprising, displaying one of a fourth counter indicating a total number of times the at least one conditional breakpoint fired and a fifth counter indicating a total number of times the at least one conditional breakpoint fired for each thread of execution.

15. The method of claim 8, further comprising, displaying one of a fourth counter indicating a total number of times the at least one conditional breakpoint fired and a fifth counter indicating a total number or times the at least one conditional breakpoint fired for each thread of execution, the one of the fourth counter and the fifth counter being displayed proximate a position at which the at least one conditional breakpoint is set.

16. A tangible computer readable medium containing a program which, when executed, performs an operation, comprising:

determining whether a breakpoint was encountered;

if the breakpoint was encountered, determining whether the breakpoint is a conditional breakpoint;

if the breakpoint is the conditional breakpoint, incrementing at least one of a plurality of counters selected from: a first counter configured to indicate a number of times the conditional breakpoint was encountered during the debug execution, a second counter configured to indicate a total number of times the conditional breakpoint is encountered, and a third counter configured to indicate a total number of times the conditional breakpoint is encountered for each thread of execution; and     when the debug execution halts, displaying a counter value for one of the first counter, the second counter and the third counter, wherein displaying comprises passing the counter value to a debug user interface.

17. The tangible computer readable medium of claim 16, wherein the operation further comprises, if the breakpoint is the conditional breakpoint:

incrementing the first counter; and resetting the first counter to zero at the beginning of the debug execution.

18. The tangible computer readable medium of claim 16, wherein the user interface is a graphical user interface and wherein     displaying comprises displaying a value of one of the first count, the second counter and the third counter proximate a position at which the conditional breakpoint is set.

19. The tangible computer readable medium of claim 16, wherein the operation further comprises, if the breakpoint is the conditional breakpoint:

determining whether a condition for the conditional breakpoint is true; and     if the condition is true, incrementing at least one of a fourth counter configured to indicate a total number of times the conditional breakpoint fired and a fifth counter configured to indicate a total number of times the conditional breakpoint fired for each thread of execution.

20. The tangible computer readable medium of claim 16, wherein the operation further comprises, if the breakpoint is the conditional breakpoint:

determining whether a condition for the conditional breakpoint is true; and     if the condition is true, incrementing at least one of a fourth counter configured to indicate a total number of times the conditional breakpoint fired and a fifth counter configured to indicate a total number of times the conditional breakpoint fired for each thread of execution; and     displaying, when the debug execution halts, one of the fourth counter and the fifth counter by passing a counter value of one of the fourth and fifth counts, respectively, to the user interface.

21. The tangible computer readable medium of claim 16, wherein the operation further comprises, if the breakpoint is the conditional breakpoint:

determining whether a condition for the conditional breakpoint is true; and     if the condition is true, incrementing at least one of a fourth counter configured to indicate a total number of times the conditional breakpoint fired and a fifth counter configured to indicate a total number of times the conditional breakpoint fired for each thread of execution: and     displaying, when the debug execution halts, one of the fourth counter and the fifth counter proximate a position at which the conditional breakpoint is set.

22. The tangible computer readable medium of claim 16, wherein the debug execution is a debug execution between two debug stop events.

23. A tangible computer readable medium containing a program which, when executed, performs an operation, comprising:

during execution of the code, determining that at least one conditional breakpoint was encountered but not fired;

halting execution of the code upon occurrence of a debug stop event; and     displaying an encountered indicator indicating that the at least one conditional breakpoint was encountered but not fired.

24. The tangible computer readable medium of claim 23, wherein the encountered indicator is displayed proximate a position at which the each one of the at least one conditional breakpoint is set.

25. The tangible computer readable medium of claim 23, wherein the encountered indicator is displayed in a breakpoint panel of a user interface screen.

26. The tangible computer readable medium of claim 23, wherein the operation further comprises, displaying one of a first counter indicating a number of times the at least one conditional breakpoint was encountered, a second counter indicating a total number of times the at least one conditional breakpoint was encountered, and a third counter indicating a total number of times the at least one conditional breakpoint was encountered for each thread of execution.

27. The tangible computer readable medium of claim 23, wherein the operation further comprises, displaying one of a first counter indicating a number of times the at least one conditional breakpoint was encountered, a second counter indicating a total number of times the at least one conditional breakpoint was encountered, and a third counter indicating a total number of times the at least one conditional breakpoint was encountered for each thread of execution; and wherein the first counter is reset to zero at the beginning of each debug execution.

28. The tangible computer readable medium of claim 23, wherein the operation further comprises, displaying one of a first counter indicating a number of times the at least one conditional breakpoint was encountered, a second counter indicating a total number of times the at least one conditional breakpoint was encountered, and a third counter indicating a total number of times the at least one conditional breakpoint was encountered for each thread of execution, the one of the first counter, the second counter and the third counter being displayed proximate a position at which the at least one conditional breakpoint is set.

29. The tangible computer readable medium of claim 23, wherein the operation further comprises, displaying one of a fourth counter indicating a total number of times the at least one conditional breakpoint fired and a fifth counter indicating a total number of times the at least one conditional breakpoint fired for each thread of execution.

30. The tangible computer readable medium of claim 23, wherein the operation further comprises, displaying one of a fourth counter indicating a total number of times the at least one conditional breakpoint fired and a fifth counter indicating a total number of times the at least one conditional breakpoint fired for each thread of execution, the one of the fourth counter and the fifth counter being displayed proximate a position at which the at least one conditional breakpoint is set.

31. A computer, comprising:
a memory containing a debugging program; and
a processor which, when executing the program, performs an operation comprising:
determining whether a breakpoint was encountered;
if the breakpoint was encountered, determining whether the breakpoint is a conditional breakpoint; and
if the breakpoint is the conditional breakpoint, incrementing at least one of a plurality of counters selected from: a first counter configured to indicate a number of times the conditional breakpoint was encountered during the debug execution, a second counter configured to indicate a total number of times the conditional breakpoint is encountered, and a third counter configured to indicate a total number of times the conditional breakpoint is encountered for each thread of execution; and
when the debug execution halts, displaying a counter value for one of the first counter, the second counter and the third counter; wherein displaying comprises passing the counter value to a debug user interface.

32. A computer, comprising:

a memory containing a debugging program; and a processor which, when executing the program, performs an operation comprising:

during execution of the code, determining that at least one conditional breakpoint was encountered but not fired;

halting execution of the code upon occurrence of a debug stop event; and displaying an encountered indicator indicating that the at least one conditional breakpoint was encountered but not fired.

\* \* \* \* \*